US012276087B2

(12) United States Patent
Kumagai et al.

(10) Patent No.: US 12,276,087 B2
(45) Date of Patent: Apr. 15, 2025

(54) WORK MACHINE

(71) Applicant: Hitachi Construction Machinery Co., Ltd., Tokyo (JP)

(72) Inventors: Kento Kumagai, Ami-machi (JP); Shinya Imura, Toride (JP); Genroku Sugiyama, Tsuchiura (JP); Katsuaki Kodaka, Tsukuba (JP); Yasutaka Tsuruga, Ryugasaki (JP); Takaaki Chiba, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 440 days.

(21) Appl. No.: 17/636,094

(22) PCT Filed: Oct. 21, 2020

(86) PCT No.: PCT/JP2020/039612

§ 371 (c)(1),
(2) Date: Feb. 17, 2022

(87) PCT Pub. No.: WO2021/131277

PCT Pub. Date: Jul. 1, 2021

(65) Prior Publication Data

US 2022/0298752 A1 Sep. 22, 2022

(30) Foreign Application Priority Data

Dec. 27, 2019 (JP) ................................ 2019-238879

(51) Int. Cl.
*E02F 9/22* (2006.01)
*F15B 13/044* (2006.01)

(52) U.S. Cl.
CPC .......... *E02F 9/2228* (2013.01); *E02F 9/2267* (2013.01); *E02F 9/2271* (2013.01);
(Continued)

(58) Field of Classification Search
CPC ..... E02F 9/2296; E02F 9/2292; E02F 9/2825; E02F 9/2267; E02F 9/2228; F15B 11/17
See application file for complete search history.

(56) References Cited

U.S. PATENT DOCUMENTS 5,433,076 A 7/1995 Sugiyama et al.
5,835,874 A 11/1998 Hirata et al.
(Continued)

FOREIGN PATENT DOCUMENTS

EP 2 781 661 A2 9/2014
JP 6-193604 A 7/1994
(Continued)

OTHER PUBLICATIONS

International Search Report (PCT/ISA/210) issued in PCT Application No. PCT/JP2020/039612 dated Dec. 8, 2020 with English translation (four (4) pages).
(Continued)

*Primary Examiner* — Kenneth Bomberg
*Assistant Examiner* — Daniel S Collins
(74) *Attorney, Agent, or Firm* — Crowell & Moring LLP

(57) ABSTRACT

There is provided a work machine which can improve accuracy of control of an actuator when a pressure difference between a hydraulic pump and the actuator is large and the demanded flow rate of the actuator is small. An auxiliary flow rate controller is configured such that an opening area of a main valve changes between a maximum opening area and zero according to the opening area of a pilot variable restrictor when the opening area of the pilot variable restrictor is equal to or more than a predetermined opening area and that the opening area of the main valve is zero irrespective of the opening area of the pilot variable restrictor when the opening area of the pilot variable restrictor is less than the predetermined opening area.

3 Claims, 13 Drawing Sheets

(52) U.S. Cl.
CPC .......... *E02F 9/2285* (2013.01); *E02F 9/2292* (2013.01); *F15B 13/044* (2013.01); *E02F 9/2296* (2013.01); *F15B 2211/35* (2013.01)

(56) References Cited

U.S. PATENT DOCUMENTS

| | | | | |
|---|---|---|---|---|
| 2017/0227028 | A1 | 8/2017 | Ueda | |
| 2021/0002868 | A1* | 1/2021 | Kumagai | E02F 9/2285 |

FOREIGN PATENT DOCUMENTS

| | | | |
|---|---|---|---|
| JP | 9-177711 | A | 7/1997 |
| JP | 3056254 | B2 | 6/2000 |
| JP | 3144915 | B2 | 3/2001 |
| JP | 2004-270900 | A | 9/2004 |
| JP | 2014-31827 | A | 2/2014 |
| JP | 2014-185665 | A | 10/2014 |
| JP | 2017-137968 | A | 8/2017 |

OTHER PUBLICATIONS

Japanese-language Written Opinion (PCT/ISA/237) issued in PCT Application No. PCT/JP2020/039612 dated Dec. 8, 2020 (three (3) pages).
International Preliminary Report on Patentability (PCT/IB/338 & PCT/IB/373) issued in PCT Application No. PCT/JP2020/039612 dated Jul. 7, 2022, including English translation of document C2 (Japanese-language Written Opinion (PCT/ISA/237), filed on Feb. 17, 2022) (five (5) pages).

* cited by examiner

WORK MACHINE

TECHNICAL FIELD

The present invention relates to a work machine such as a hydraulic excavator.

BACKGROUND ART

A work machine such as a hydraulic excavator includes a machine body including a swing structure; and a work device (front device) attached to the swing structure. The work device includes a boom (front device member) connected to the swing structure in such a manner as to be rotatable in an upward-downward direction; an arm (front device member) connected to a distal end of the boom in such a manner as to be rotatable in a forward-rearward direction or the upward-downward direction; a bucket (front device member) connected to a distal end of the arm in such a manner as to be rotatable in the forward-rearward direction or the upward-downward direction; a boom cylinder (actuator) that drives the boom; an arm cylinder (actuator) that drives the arm; and a bucket cylinder (actuator) that drives the bucket. It is not easy to excavate a predetermined region by operating the front device members of the work machine by respective manual control levers. An operator needs to have skilled operating techniques.

Accordingly, a technology for facilitating such work has been proposed (Patent Document 1).

An area limiting excavation control system of a construction machine described in Patent Document 1 includes detecting means for detecting the position of a front device; a controller including a computing section configured to compute the position of the front device on the basis of a signal from the detecting means, a section configured to set an entry prohibiting region that the front device is prohibited from entering, and a computing section configured to calculate a control gain of a control lever signal from the entry prohibiting region and the front device position; and actuator control means for controlling the movement of an actuator from the calculated control gain. According to such a configuration, the lever operation signal is controlled according to a distance to a boundary line of the entry prohibiting region. Thus, even when an operator erroneously tries to move a distal end of a bucket to the entry prohibiting region, the locus of the distal end of the bucket is automatically controlled in such a manner as to be along the boundary. Consequently, anyone can perform stable work with high accuracy without depending on a degree of mastery of the operating techniques by the operator.

Here, the following problems are presented when the construction machine described in Patent Document 1 is assumed to perform switching between manual operation by the operator and a function of automatic control of the machine body according to work contents. When the automatic control of the machine body is performed according to a command from the controller, it is important for a distal end of the front device to move accurately along a target locus, and this requires a target flow rate to be accurately supplied to the actuator. However, in the area limiting excavation control system of Patent Document 1, the opening amount of a directional control valve is controlled according to a lever operation amount. Hence, flow rate supply to the actuator may be unstable due to a change in a differential pressure across the directional control valve, the change accompanying load variation of the actuator.

A technology illustrated in Patent Document 2 is proposed as one technology for solving such problems.

In a hydraulic control valve system described in Patent Document 2, a poppet type auxiliary flow control valve that performs pressure compensation for each directional control valve of each actuator is disposed in series with each directional control valve. Thus, not only is the opening amount of the directional control valve controlled for the input amount of a control lever, but also a differential pressure across the directional control valve is controlled by the pressure compensating valve. It is thereby possible to perform accurate flow rate supply to the actuator without depending on a load on the actuator.

PRIOR ART DOCUMENT

Patent Documents

Patent Document 1: Japanese Patent No. 3056254
Patent Document 2: Japanese Patent No. 3144915

SUMMARY OF THE INVENTION

Problems to be Solved by the Invention

In the hydraulic control valve system described in Patent Document 2, the main valve of the auxiliary flow control valve has a poppet shape. Thus, there is a small flow loss as compared with a spool type valve, and a check function can be provided because there is substantially no leak at a time of seating. In addition, the main valve has high responsiveness because a valve shift is decided by a balance of forces caused by pressures on a pump side, an actuator side, and a back pressure side.

However, the poppet valve generally tends to be affected by a fluid force, and also tends to be affected by pulsation or a pressure variation because of the above-described high responsiveness to a pressure change. Therefore, the behavior of a valve body tends to be destabilized, and accuracy of flow rate control tends to be decreased under a condition where control needs to be performed at small opening at a time of a small flow rate, a high pressure difference, or the like, in particular.

On the other hand, in work which uses the automatic control of a work machine such as a hydraulic excavator and which requires accuracy of control of an actuator, in particular, the actuator needs to be operated at low speed while an excavation load is applied thereto. At this time, flow conditions surrounding a valve controlling a flow rate supplied to the actuator are often a small flow rate and a high pressure difference.

Therefore, in work that requires accuracy of control of the actuator when the automatic control of the work machine such as the hydraulic excavator is performed by using the configuration of the hydraulic control valve system described in Patent Document 2, the flow rate control accuracy of the auxiliary flow control valve may be decreased, and a decrease in accuracy of control of the actuator may be incurred.

The present invention has been made in view of the above-described problems. It is an object of the present invention to provide a work machine that can improve accuracy of control of an actuator when a pressure difference between a hydraulic pump and the actuator is large and the demanded flow rate of the actuator is small.

Means for Solving the Problems

In order to achieve the above object, according to the present invention, there is provided a work machine including a machine body, a work device attached to the machine body, a plurality of actuators that drive the machine body or the work device, a hydraulic pump, a plurality of directional control valves that are connected in parallel to a delivery line of the hydraulic pump and adjust flows of hydraulic fluid supplied from the hydraulic pump to the plurality of actuators, a control lever for giving an instruction for operation of the plurality of actuators, a pilot pump, a solenoid valve unit that reduces a pressure of hydraulic fluid supplied from the pilot pump, and outputs the reduced pressure as operation pressures of the plurality of directional control valves, a controller that outputs a command to the solenoid valve unit according to an operation instruction amount from the control lever, and auxiliary flow rate controllers that are respectively arranged upstream of the plurality of directional control valves and limit flow rates of hydraulic fluid supplied from the hydraulic pump to the plurality of directional control valves. The auxiliary flow rate controllers each include a seat type main valve, a control variable restrictor that changes an opening area according to an amount of movement of a valve body of the main valve, a pilot line that connects a downstream side of the main valve and a downstream side of the control variable restrictor to each other and decides the amount of movement of the valve body according to a passing flow rate, and a spool type pilot variable restrictor that is disposed on the pilot line and changes an opening area according to a command from the controller. The auxiliary flow rate controllers are each configured such that an opening area of the main valve changes between a maximum opening area and zero according to the opening area of the pilot variable restrictor in a case where the opening area of the pilot variable restrictor is equal to or more than a predetermined opening area and that the opening area of the main valve is zero irrespective of the opening area of the pilot variable restrictor in a case where the opening area of the pilot variable restrictor is less than the predetermined opening area.

According to the present invention configured as described above, in an operation performed when the demanded flow rate of an actuator is large or when a pressure difference between the hydraulic pump and the actuator is small, that is, in an operation in which the opening amount of the auxiliary flow rate controller needs to be increased, the opening amount of the auxiliary flow rate controller can be adjusted by a total opening area of the pilot variable restrictor and the main valve by opening the main valve together with the pilot variable restrictor.

On the other hand, in an operation performed when the pressure difference between the hydraulic pump and the actuator is large and the demanded flow rate of the actuator is small, that is, in an operation in which the opening amount of the auxiliary flow rate controller needs to be decreased, the opening amount of the auxiliary flow rate controller can be adjusted by only the opening area of the pilot variable restrictor by closing the seat type main valve and opening only the spool type pilot variable restrictor. It is therefore possible to adjust with high accuracy the flow rate supplied to the actuator and thus improve accuracy of control of the actuator.

Advantages of the Invention

The work machine according to the present invention can improve accuracy of control of the actuator when the pressure difference between the hydraulic pump and the actuator is large and the demanded flow rate of the actuator is small.

MODES FOR CARRYING OUT THE INVENTION

Figure 1:
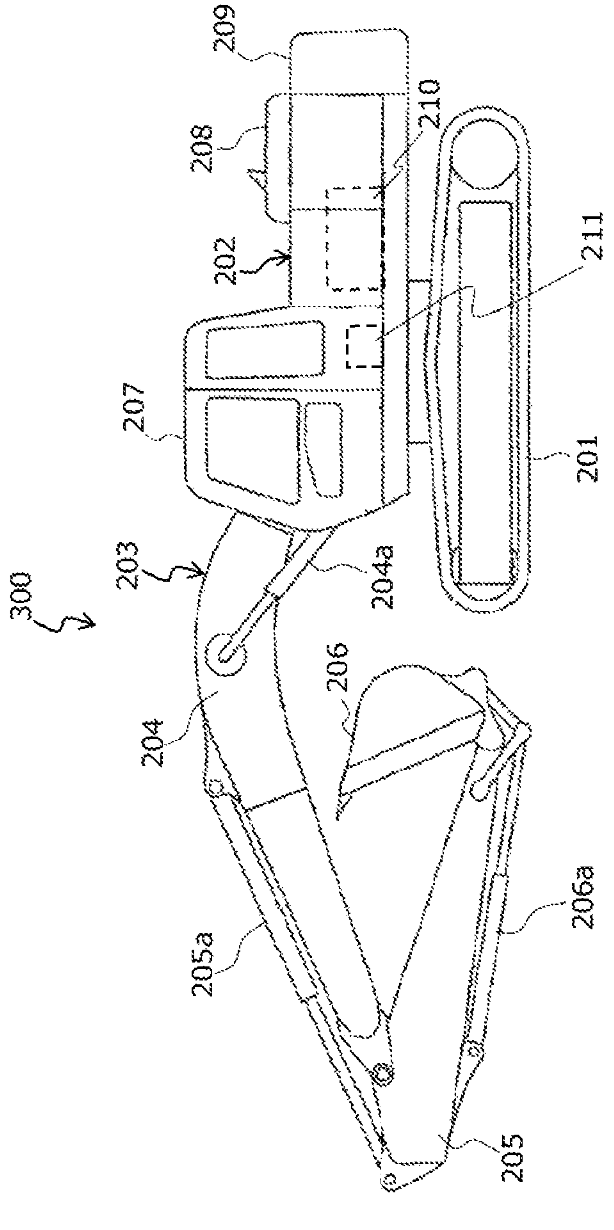
FIG. 1 is a side view of a hydraulic excavator according to embodiments of the present invention.

Description will hereinafter be made with reference to the drawings by taking, for example, a hydraulic excavator as a work machine according to embodiments of the present invention. Incidentally, in the figures, similar members are identified by the same reference numerals, and repeated description thereof will be omitted as appropriate.

FIG. 1 is a side view of a hydraulic excavator according to the present embodiments.

As depicted in FIG. 1, the hydraulic excavator 300 includes a track structure 201; a swing structure 202 that is swingably disposed on the track structure 201 and constitutes a machine body; and a work device 203 that is attached to the swing structure 202 in such a manner as to be rotatable in an upward-downward direction and performs excavation work on soil or the like. The swing structure 202 is driven by a swing motor 211.

The work device 203 includes a boom 204 attached to the swing structure 202 in such a manner as to be rotatable in the upward-downward direction; an arm 205 attached to a distal end of the boom 204 in such a manner as to be rotatable in the upward-downward direction; and a bucket 206 attached to a distal end of the arm 205 in such a manner as to be rotatable in the upward-downward direction. The boom 204 is driven by a boom cylinder 204*a*. The arm 205 is driven by an arm cylinder 205*a*. The bucket 206 is driven by a bucket cylinder 206*a*.

A cab 207 is provided at a front side position on the swing structure 202. A counterweight 209 that ensures a weight balance is provided at a rear side position on the swing structure 202. A machine room 208 that houses an engine, hydraulic pumps, and the like is provided between the cab 207 and the counterweight 209. A control valve 210 is installed in the machine room 208.

The hydraulic excavator 300 according to the present embodiments includes a hydraulic drive system to be described in the following embodiment.

First Embodiment

Figure 2A:
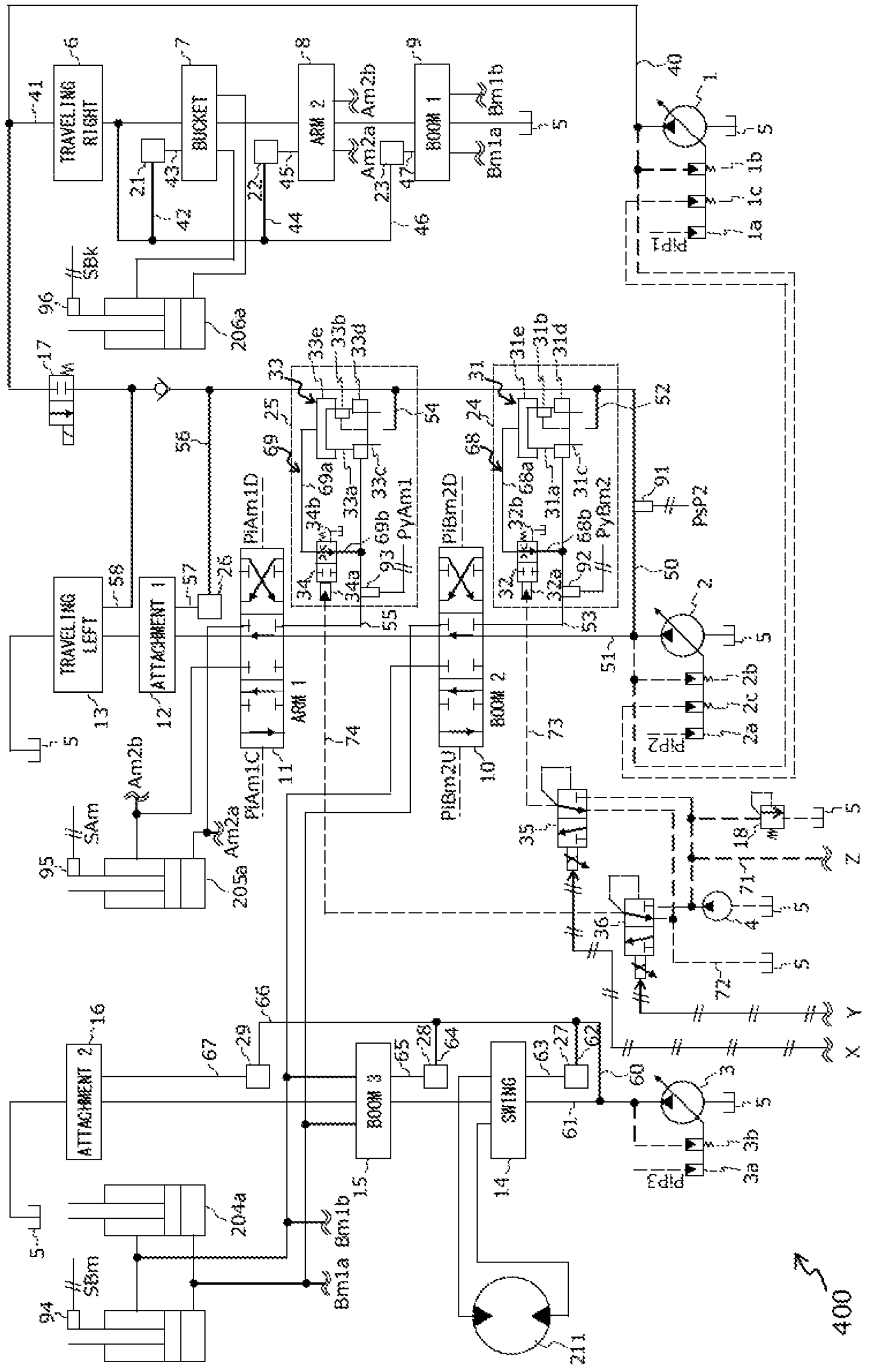
FIG. 2A is a circuit diagram (1/2) of a hydraulic drive system in a first embodiment of the present invention.
Figure 2B:
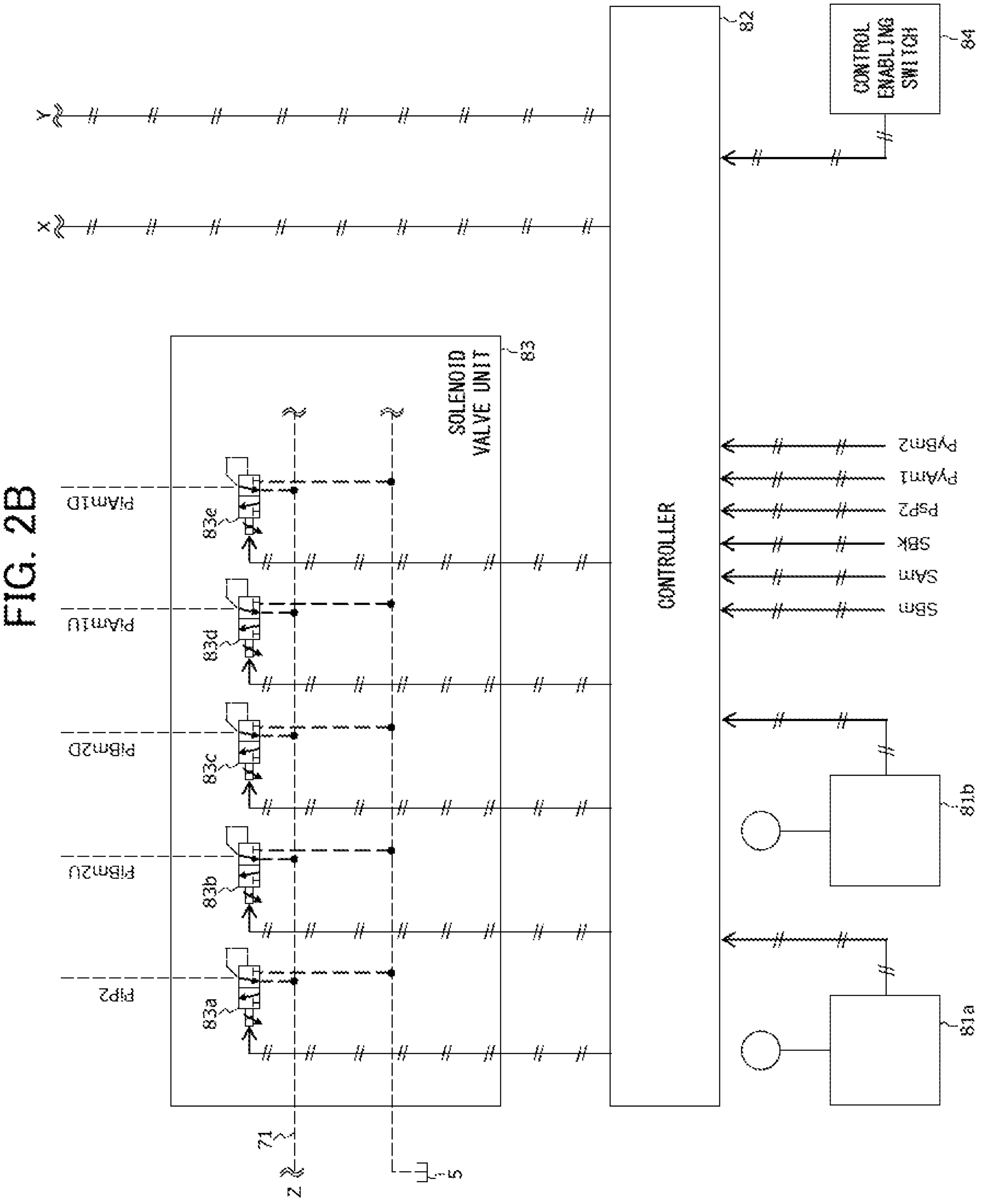
FIG. 2B is a circuit diagram (2/2) of the hydraulic drive system in the first embodiment of the present invention.

FIG. 2A and FIG. 2B are circuit diagrams of a hydraulic drive system in a first embodiment of the present invention.

(1) Configuration

A hydraulic drive system 400 in the first embodiment includes three main hydraulic pumps driven by the engine not depicted, for example, a first hydraulic pump 1, a second hydraulic pump 2, and a third hydraulic pump 3 each constituted by a variable displacement type hydraulic pump. In addition, the hydraulic drive system 400 includes a pilot pump 4 driven by the engine not depicted, and also includes a hydraulic operating fluid tank 5 that supplies oil to the first to third hydraulic pumps 1 to 3 and the pilot pump 4.

The tilting angle of the first hydraulic pump 1 is controlled by a regulator attached to the first hydraulic pump 1. The regulator of the first hydraulic pump 1 includes a flow rate control command pressure port 1*a*, a first hydraulic pump self-pressure port 1*b*, and a second hydraulic pump self-pressure port 1*c*. The tilting angle of the second hydraulic pump 2 is controlled by a regulator attached to the second hydraulic pump 2. The regulator of the second hydraulic pump 2 includes a flow rate control command pressure port 2*a*, a second hydraulic pump self-pressure port 2*b*, and a first hydraulic pump self-pressure port 2*c*. The tilting angle of the third hydraulic pump 3 is controlled by a regulator attached to the third hydraulic pump 3. The regulator of the third hydraulic pump 3 includes a flow rate control command pressure port 3*a* and a third hydraulic pump self-pressure port 3*b*.

A delivery line 40 of the first hydraulic pump 1 is connected to the hydraulic operating fluid tank 5 via a center bypass line 41. Arranged on the center bypass line 41 are, in order from an upstream side, a right travelling directional control valve 6 that controls the driving of a right travelling motor, not depicted, of a pair of travelling motors for driving the track structure 201, a bucket directional control valve 7 that controls a flow of hydraulic fluid supplied to the bucket cylinder 206*a*, a second arm directional control valve 8 that controls a flow of hydraulic fluid supplied to the arm cylinder 205*a*, and a first boom directional control valve 9 that controls a flow of hydraulic fluid supplied to the boom cylinder 204*a*. Respective supply ports of the bucket directional control valve 7, the second arm directional control valve 8, and the first boom directional control valve 9 are connected in parallel to a part of the center bypass line 41, the part connecting the right travelling directional control valve 6 and the bucket directional control valve 7 to each other, via hydraulic fluid lines 42 and 43, hydraulic fluid lines 44 and 45, and hydraulic fluid lines 46 and 47, respectively.

A delivery line 50 of the second hydraulic pump 2 is connected to the hydraulic operating fluid tank 5 via a center bypass line 51, and is connected to the delivery line 40 of the first hydraulic pump 1 via a confluence valve 17. Arranged on the center bypass line 51 are, in order from an upstream side, a second boom directional control valve 10 that controls a flow of hydraulic fluid supplied to the boom cylinder 204*a*, a first arm directional control valve 11 that controls a flow of hydraulic fluid supplied to the arm cylinder 205*a*, a first attachment directional control valve 12 that controls a flow of hydraulic fluid supplied to a first actuator, not depicted, for driving a first special attachment such as a pulverizer provided in place of the bucket 206, for example, and a left travelling directional control valve 13 that controls the driving of a left travelling motor, not depicted, of the pair of travelling motors for driving the track structure 201. Respective supply ports of the second boom directional control valve 10, the first arm directional control valve 11, the first attachment directional control valve 12, and the left travelling directional control valve 13 are connected in parallel to the delivery line 50 of the second hydraulic pump 2 via hydraulic fluid lines 52 and 53, hydraulic fluid lines 54 and 55, hydraulic fluid lines 56 and 57, and a hydraulic fluid line 58, respectively.

A delivery line 60 of the third hydraulic pump 3 is connected to the hydraulic operating fluid tank 5 via a center bypass line 61. Arranged on the center bypass line 61 are, in order from an upstream side, a swing directional control valve 14 that controls a flow of hydraulic fluid supplied to the swing motor 211 for driving the swing structure 202, a third boom directional control valve 15 that controls a flow of hydraulic fluid supplied to the boom cylinder 204*a*, and a second attachment directional control valve 16. When a second special attachment provided with a second actuator is fitted in addition to the first special attachment, or when the second special attachment provided with two actuators, that is, the first actuator and the second actuator is fitted in place of a first special actuator, the second attachment directional control valve 16 is used to control a flow of hydraulic fluid supplied to the second actuator. Respective supply ports of the swing directional control valve 14, the third boom directional control valve 15, and the second attachment directional control valve 16 are connected in parallel to the delivery line 60 of the third hydraulic pump 3 via hydraulic fluid lines 62 and 63, hydraulic fluid lines 64 and 65, and hydraulic fluid lines 66 and 67, respectively.

The boom cylinder 204*a*, the arm cylinder 205*a*, and the bucket cylinder 206*a* are respectively provided with stroke sensors 94, 95, and 96 that detect a stroke amount, with an objective of obtaining the operation state of the hydraulic excavator 300. Incidentally, means for obtaining the operation state of the hydraulic excavator 300 is various, such as inclination sensors, rotation angle sensors, or IMUs, and is not limited to the above-described stroke sensors.

The hydraulic fluid lines 42 and 43 connected to the supply port of the bucket directional control valve 7, the hydraulic fluid lines 44 and 45 connected to the supply port of the second arm directional control valve 8, and the hydraulic fluid lines 46 and 47 connected to the supply port of the first boom directional control valve 9 are respectively provided with auxiliary flow rate controllers 21, 22, and 23 that limit the flow rate of the hydraulic fluid supplied from the first hydraulic pump 1 to each directional control valve at a time of a combined operation.

The hydraulic fluid lines 52 and 53 connected to the supply port of the second boom directional control valve 10, the hydraulic fluid lines 54 and 55 connected to the supply port of the first arm directional control valve 11, and the hydraulic fluid lines 56 and 57 connected to the supply port of the first attachment directional control valve 12 are respectively provided with auxiliary flow rate controllers 24, 25, and 26 that limit the flow rate of the hydraulic fluid supplied from the second hydraulic pump 2 to each directional control valve at the time of the combined operation.

The hydraulic fluid lines 62 and 63 connected to the supply port of the swing directional control valve 14, the hydraulic fluid lines 64 and 65 connected to the supply port of the third boom directional control valve 15, and the hydraulic fluid lines 66 and 67 connected to the supply port of the second attachment directional control valve 16 are respectively provided with auxiliary flow rate controllers 27, 28, and 29 that limit the flow rate of the hydraulic fluid supplied from the third hydraulic pump 3 to each directional control valve at the time of the combined operation.

A delivery port of the pilot pump 4 is connected to the hydraulic operating fluid tank 5 via a pilot relief valve 18 for generation of a pilot primary pressure, and is connected to a solenoid valve unit 83 via a hydraulic fluid line 71. The solenoid valve unit 83 includes solenoid proportional pressure reducing valves 83*a*, 83*b*, 83*c*, 83*d*, and 83*e*. One input ports of the solenoid proportional pressure reducing valves 83*a* to 83*e* are connected to the hydraulic fluid line 71. Other input ports of the solenoid proportional pressure reducing valves 83*a* to 83*e* are connected to the hydraulic operating fluid tank 5. An output port of the solenoid proportional pressure reducing valve 83*a* is connected to the flow rate control command pressure port 2*a* of the regulator of the second hydraulic pump 2. Output ports of the solenoid proportional pressure reducing valves 83*b* and 83*c* are connected to pilot ports of the second boom directional control valve 10. Output ports of the solenoid proportional pressure reducing valves 83*d* and 83*e* are connected to pilot ports of the first arm directional control valve 11. The solenoid proportional pressure reducing valves 83*a* to 83*e* each reduce the pilot primary pressure according to a command electric signal from a controller 82, and output the pilot primary pressure as a pilot command pressure of the directional control valve.

Incidentally, for simplification of the description, the following are not depicted: solenoid proportional pressure reducing valves for the flow rate control command pressure ports 1*a* and 3*a* of the regulators of the first hydraulic pump 1 and the third hydraulic pump 3, solenoid proportional pressure reducing valves for the right travelling directional control valve 6, solenoid proportional pressure reducing valves for the bucket directional control valve 7, solenoid proportional pressure reducing valves for the second arm directional control valve 8, solenoid proportional pressure reducing valves for the first boom directional control valve 9, solenoid proportional pressure reducing valves for the first attachment directional control valve 12, solenoid proportional pressure reducing valves for the left travelling directional control valve 13, solenoid proportional pressure reducing valves for the swing directional control valve 14, solenoid proportional pressure reducing valves for the third boom directional control valve 15, and solenoid proportional pressure reducing valves for the second attachment directional control valve 16.

In the first embodiment, the auxiliary flow rate controller 24 includes a seat type main valve 31 that forms an auxiliary variable restrictor; a control variable restrictor 31*b* that is provided to a valve body 31*a* of the main valve 31, and changes an opening area according to an amount of movement of the valve body 31*a*; and a pilot variable restrictor 32. A housing including the main valve 31 has a first pressure chamber 31*c* formed in a connecting portion of the main valve 31 and the hydraulic fluid line 52, a second pressure chamber 31*d* formed in a connecting portion of the main valve 31 and the hydraulic fluid line 53, and a third pressure chamber 31*e* formed in such a manner as to communicate with the first pressure chamber 31*c* via the control variable restrictor 31*b*. The third pressure chamber 31*e* and the pilot variable restrictor 32 are connected to each other by a hydraulic fluid line 68*a*. The pilot variable restrictor 32 and the hydraulic fluid line 53 are connected to each other by a hydraulic fluid line 68*b*. The hydraulic fluid lines 68*a* and 68*b* form a pilot line 68.

A pilot port 32*a* of the pilot variable restrictor 32 is connected to an output port of a solenoid proportional pressure reducing valve 35. A supply port of the solenoid proportional pressure reducing valve 35 is connected to the delivery port of the pilot pump 4. A tank port of the solenoid proportional pressure reducing valve 35 is connected to the hydraulic operating fluid tank 5. The solenoid proportional pressure reducing valve 35 reduces the pilot primary pressure according to a command electric signal from the controller 82, and outputs the pilot primary pressure as a pilot command pressure of the pilot variable restrictor 32.

The delivery line 50 of the second hydraulic pump 2 is provided with a pressure sensor 91. The hydraulic fluid line 53 that connects the second boom directional control valve 10 and the auxiliary flow rate controller 24 to each other is provided with a pressure sensor 92.

Incidentally, though partly not depicted for simplification of the description, the auxiliary flow rate controllers 21 to 29 and peripheral apparatuses, piping, and wiring all have same configurations.

The hydraulic drive system 400 in the first embodiment has a control lever 81*a* capable of performing switching operation on the first boom directional control valve 9 and the second boom directional control valve 10 and a control lever 81*b* capable of performing switching operation on the first arm directional control valve 11 and the second arm directional control valve 8. Incidentally, for simplification of the description, the following are not depicted: a right travelling control lever that performs switching operation on the right travelling directional control valve 6, a bucket control lever that performs switching operation on the bucket directional control valve 7, a first attachment control lever that performs switching operation on the first attachment directional control valve 12, a left travelling control lever that performs switching operation on the left travelling directional control valve 13, a swing control lever that performs switching operation on the swing directional control valve 14, and a second attachment control lever that performs switching operation on the second attachment directional control valve 16.

The hydraulic drive system 400 in the first embodiment includes the controller 82. Output values of the control levers 81*a* and 81*b*, output values of the pressure sensors 91, 92, and 93, output values of the stroke sensors 94, 95, and 96, and a command value of a control enabling switch 84 are input to the controller 82. In addition, the controller 82 outputs command electric signals to each solenoid proportional pressure reducing valve included in the solenoid valve unit 83 and the solenoid proportional pressure reducing valves 35 and 36 (and the solenoid proportional pressure reducing valves not depicted).

Figure 3:
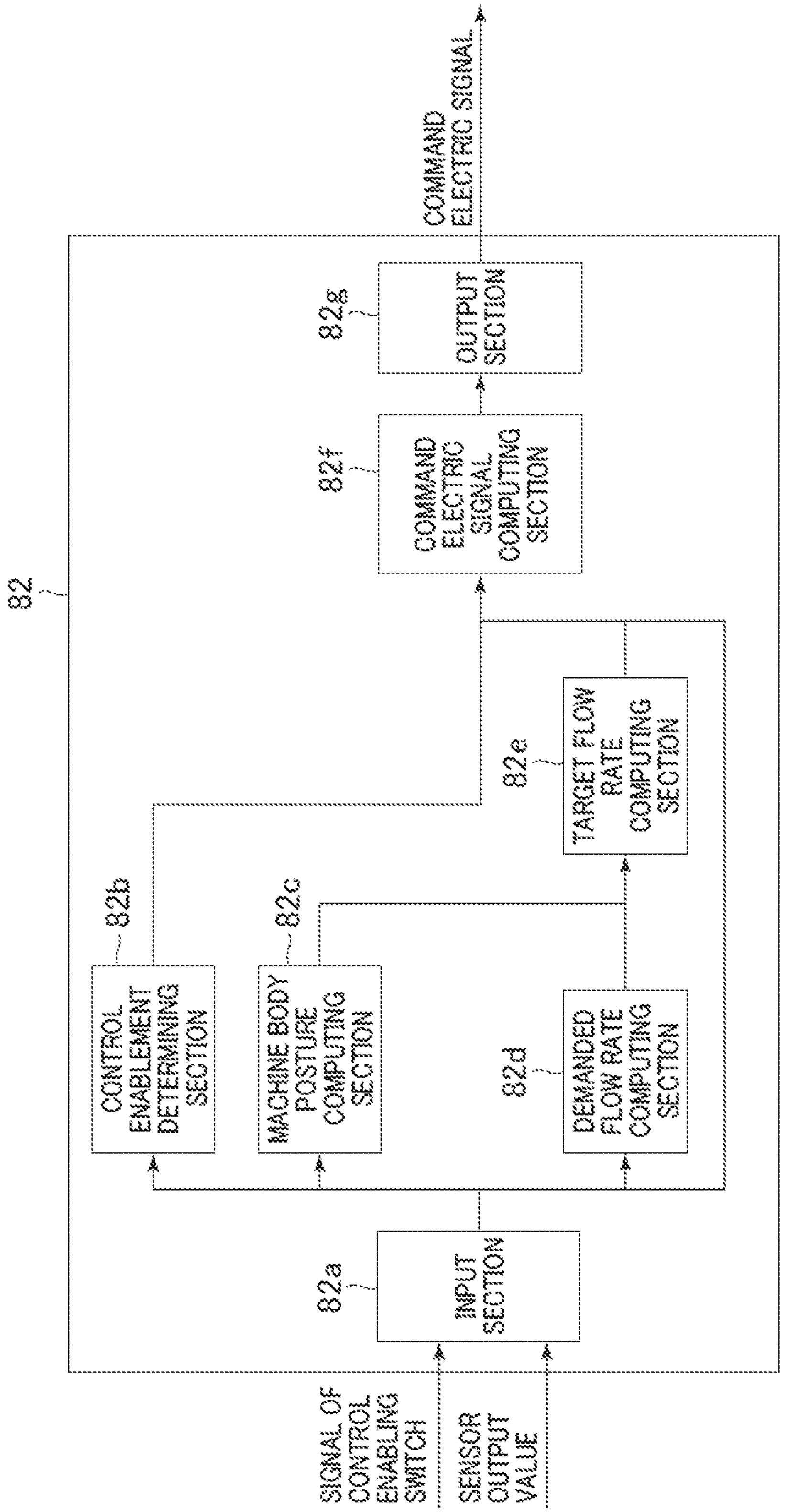
FIG. 3 is a functional block diagram of a controller depicted in FIG. 2B.

FIG. 3 is a functional block diagram of the controller 82. In FIG. 3, the controller 82 includes an input section 82*a*, a control enablement determining section 82*b*, a machine body posture computing section 82*c*, a demanded flow rate computing section 82*d*, a target flow rate computing section 82*e*, a command electric signal computing section 82*f*, and an output section 82*g*.

The input section 82*a* obtains the signal of the control enabling switch 84 and the output values of the respective sensors. The control enablement determining section 82*b* determines whether to enable or disable region limiting control on the basis of the signal of the control enabling switch 84. The region limiting control is control that limits flow rates supplied to the actuators, to prevent the work device 203 from entering a preset region. The machine body posture computing section 82*c* computes the postures of the machine body 202 and the work device 203 on the basis of the sensor output values. The demanded flow rate computing section 82*d* computes demanded flow rates of the actuators on the basis of the sensor output values. The target flow rate computing section 82*e* computes target flow rates of the actuators on the basis of the postures of the machine body 202 and the work device 203 and the demanded flow rates of the actuators. The command electric signal computing section 82*f* computes command electric signals on the basis of a determination result from the control enablement determining section 82*b*, the target flow rates from the target flow rate computing section 82*e*, and the pressure sensor output values from the input section 82*a*. The output section 82*g* generates command electric signals on the basis of a result from the command electric signal computing section 82*f*, and outputs the command electric signals to each solenoid proportional pressure reducing valve of the solenoid valve unit 83 and the solenoid proportional pressure reducing valves 35 and 36.

Figure 4A:
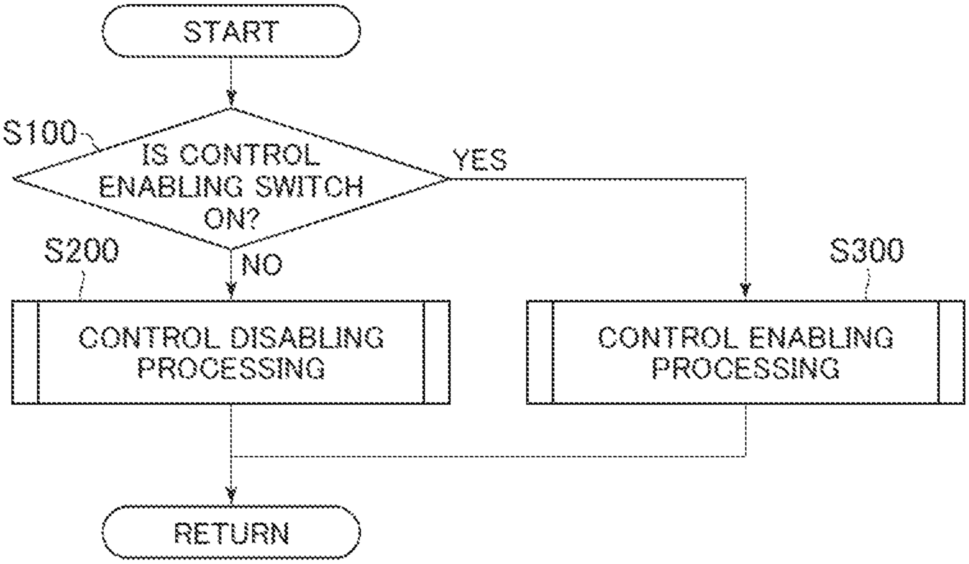
FIG. 4A is a flowchart (1/3) depicting computation processing of the controller depicted in FIG. 2B.

FIG. 4A is a flowchart depicting computation processing of the controller 82 in the first embodiment. The controller 82 determines whether or not the control enabling switch 84 is ON (step S100). The controller 82 performs control disabling processing (step S200) when the controller 82 determines that the control enabling switch 84 is OFF (NO). The controller 82 performs control enabling processing (step S300) when the controller 82 determines that the control enabling switch 84 is ON (YES).

Figure 4B:
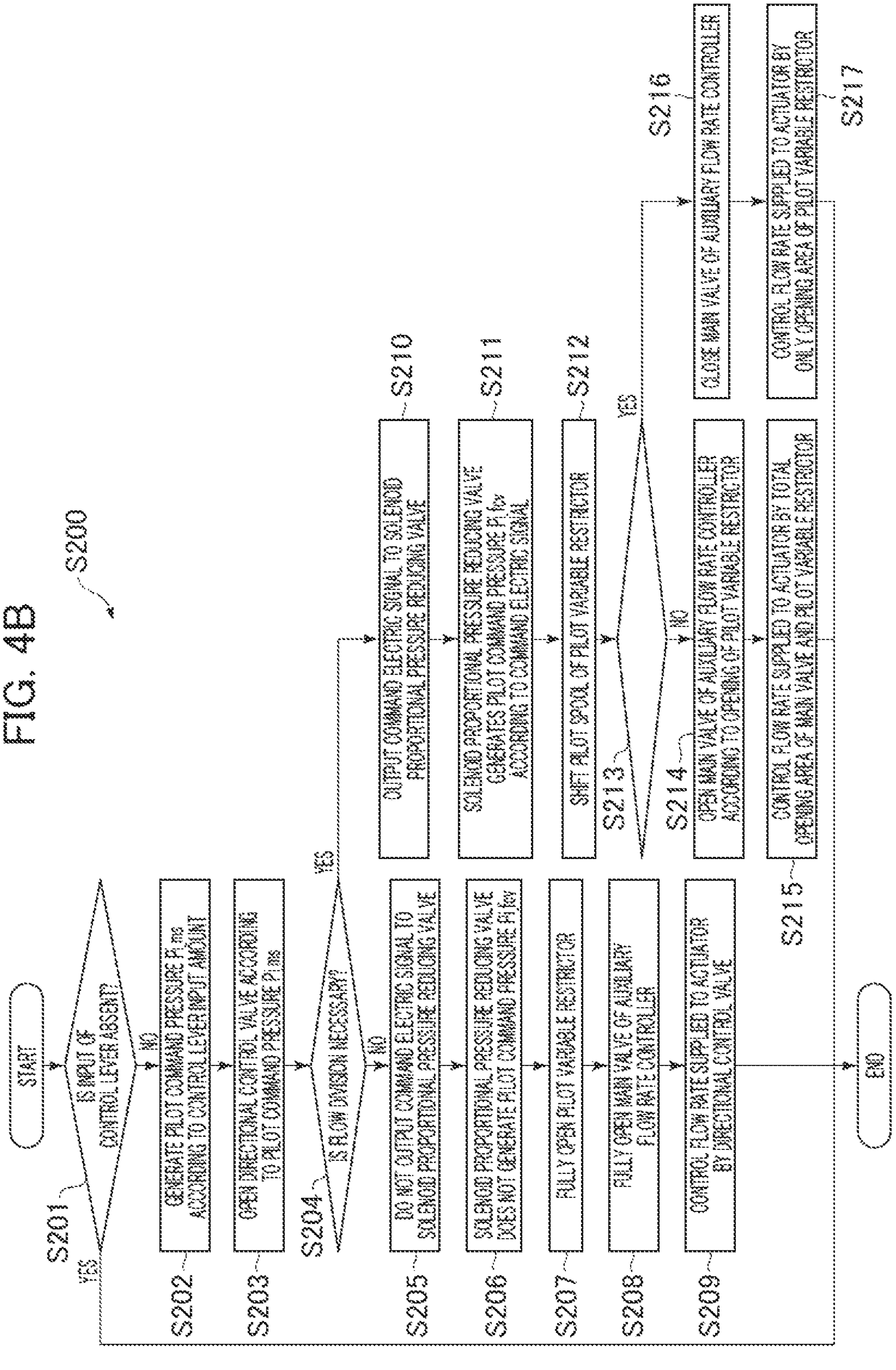
FIG. 4B is a flowchart (2/3) depicting computation processing of the controller depicted in FIG. 2B.

FIG. 4B is a flowchart depicting details of step S200 (control disabling processing). The processing depicted in FIG. 4B is performed for all of the auxiliary flow rate controllers. However, in the following, description will be made of only a part related to the auxiliary flow rate controller 24.

The controller 82 first determines whether or not input of the control lever 81*a* is absent (step S201).

When the controller 82 determines in step S201 that input of the control lever 81*a* is absent (YES), the controller 82 ends the control disabling processing (step S200).

When the controller 82 determines in step S201 that there is input of the control lever 81*a* (NO), the controller 82 generates a pilot command pressure Pi_ms (PiBM2U and PiBM2D) corresponding to a control lever input amount by the solenoid proportional pressure reducing valves 83*b* and 83*c* of the solenoid valve unit 83 (step S202), and opens the directional control valve 10 according to the pilot command pressure Pi_ms (step S203).

Following step S203, the controller 82 determines whether or not flow division for a plurality of actuators is necessary (that is, whether or not a combined operation on a plurality of actuators connected to the same delivery line is input) (step S204).

The controller 82 does not output, when determining in step S204 that the flow division is not necessary (NO), a command electric signal to the solenoid proportional pressure reducing valve 35 (step S205), the solenoid proportional pressure reducing valve 35 does not generate a pilot command pressure Pi_fcv (step S206), and the controller 82 fully opens the pilot variable restrictor 32 (step S207), fully opens the main valve 31 of the auxiliary flow rate controller 24 accordingly (step S208), controls, by the directional control valve 10, the flow rate supplied to the actuator 204*a* (step S209), and then ends the control disabling processing (step S200).

The controller 82 outputs, when determining in step S204 that the flow division is necessary (YES), a command electric signal to the solenoid proportional pressure reducing valve 35 (step S210), makes the solenoid proportional pressure reducing valve 35 generate the pilot command pressure Pi_fcv according to the command electric signal (step S211), and shifts a pilot spool 112 of the pilot variable restrictor 32 according to the pilot command pressure Pi_fcv from the solenoid proportional pressure reducing valve 35 (step S212).

Following step S212, the controller 82 determines whether or not the pilot command pressure Pi_fcv is higher than a threshold value S to be described later (step S213).

When the controller 82 determines in step S213 that the pilot command pressure Pi_fcv is equal to or lower than the threshold value S (NO), the controller 82 opens the main valve 31 of the auxiliary flow rate controller 24 according to opening of the pilot variable restrictor 32 (step S214), controls, by a total opening area of the main valve 31 and the pilot variable restrictor 32, the flow rate supplied to the actuator 204*a* (step S215), and then ends the control disabling processing (step S200).

When the controller 82 determines in step S213 that the pilot command pressure Pi_fcv is higher than the threshold value S (YES), the controller 82 allows the main valve 31 of the auxiliary flow rate controller 24 to close (step S216), controls, by only the opening area of the pilot variable restrictor 32, the flow rate supplied to the actuator 204*a* (step S217), and then ends the control disabling processing (step S200).

Figure 4C:
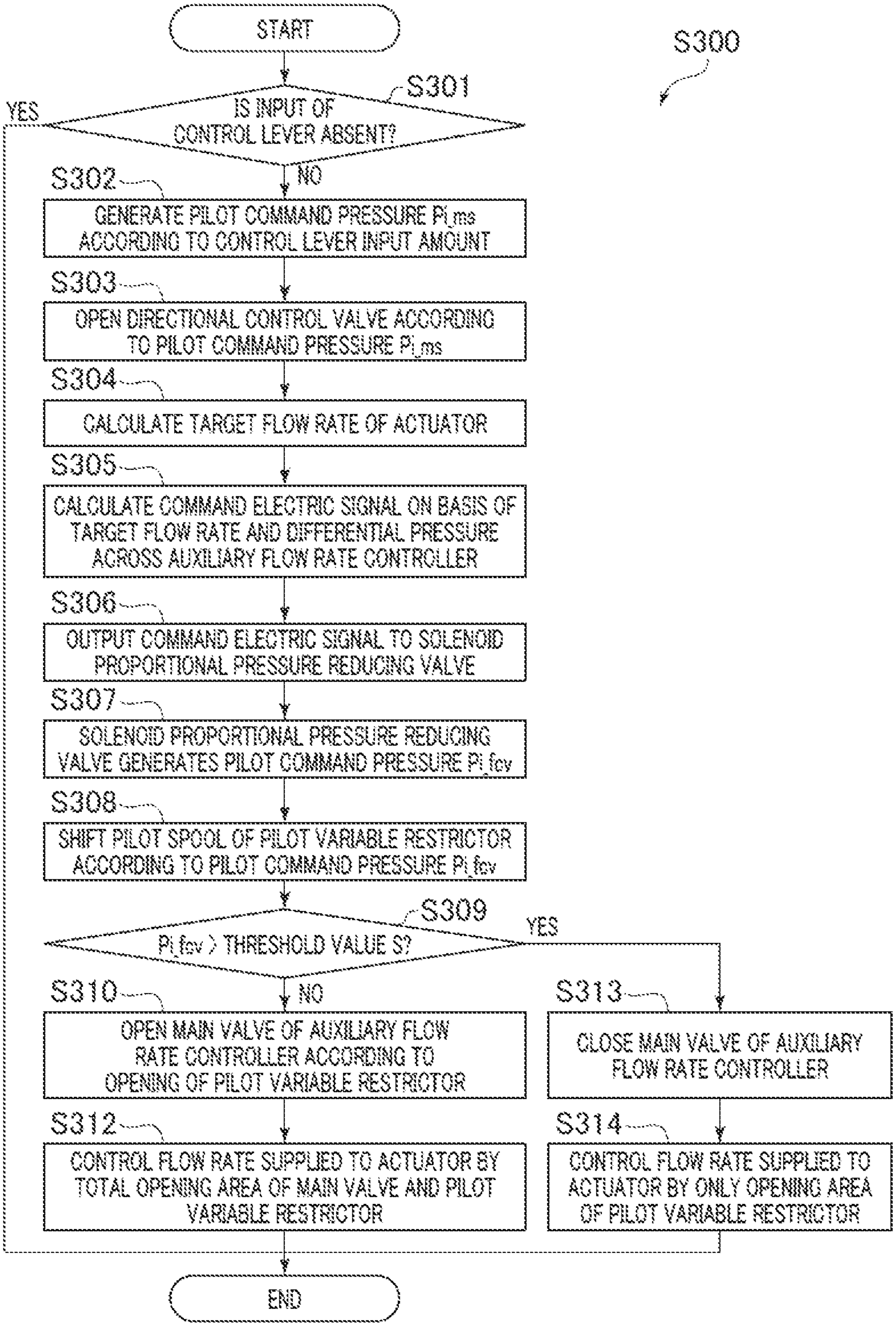
FIG. 4C is a flowchart (3/3) depicting computation processing of the controller depicted in FIG. 2B.

FIG. 4C is a flowchart depicting details of step S300 (control enabling processing). The processing depicted in FIG. 4B is performed for all of the auxiliary flow rate controllers. However, in the following, description will be made of only a part related to the auxiliary flow rate controller 24.

The controller 82 first determines whether or not input of the control lever 81*a* is absent (step S301).

When the controller 82 determines in step S301 that input of the control lever 81*a* is absent (YES), the controller 82 ends the control disabling processing (step S300).

When the controller 82 determines in step S301 that there is input of the control lever 81*a* (NO), the controller 82 generates a pilot command pressure Pi_ms (PiBm2U and PiBm2D) corresponding to a control lever input amount by the solenoid proportional pressure reducing valves 83*b* and 83*c* of the solenoid valve unit 83 (step S302), and opens the directional control valve 10 according to the pilot command pressure Pi_ms (step S303).

Following step S303, the target flow rate computing section 82*e* of the controller 82 calculates the target flow rate of the actuator 204*a* (step S304), the command electric signal computing section 82*f* of the controller 82 calculates a command electric signal on the basis of the target flow rate and a differential pressure across the auxiliary flow rate controller 24 (step S305), and then the output section 82*g* of the controller 82 outputs the command electric signal to the solenoid proportional pressure reducing valve 35 (step S306).

Following step S306, the solenoid proportional pressure reducing valve 35 generates the pilot command pressure Pi_fcv (step S307), and the pilot spool of the pilot variable restrictor 32 is shifted according to the command pressure Pi_fcv from the solenoid proportional pressure reducing valve 35 (step S308).

Following step S308, the controller 82 determines whether or not the pilot command pressure Pi_fcv is higher than the threshold value S (step S309).

When the controller 82 determines in step S309 that the pilot command pressure Pi_fcv is equal to or lower than the threshold value S (NO), the controller 82 opens the main valve 31 of the auxiliary flow rate controller 24 according to opening of the pilot variable restrictor 32 (step S310), controls, by a total opening area of the main valve 31 and the pilot variable restrictor 32, the flow rate supplied to the actuator 204*a* (step S310), and then ends the control enabling processing (step S300).

When the controller 82 determines in step S309 that the pilot command pressure Pi_fcv is higher than the threshold value S (YES), the controller 82 allows the main valve 31 of the auxiliary flow rate controller 24 to close (step S313), controls, by only the opening area of the pilot variable restrictor 32, the flow rate supplied to the actuator 204*a* (step S314), and then ends the control enabling processing (step S300).

Figure 5:
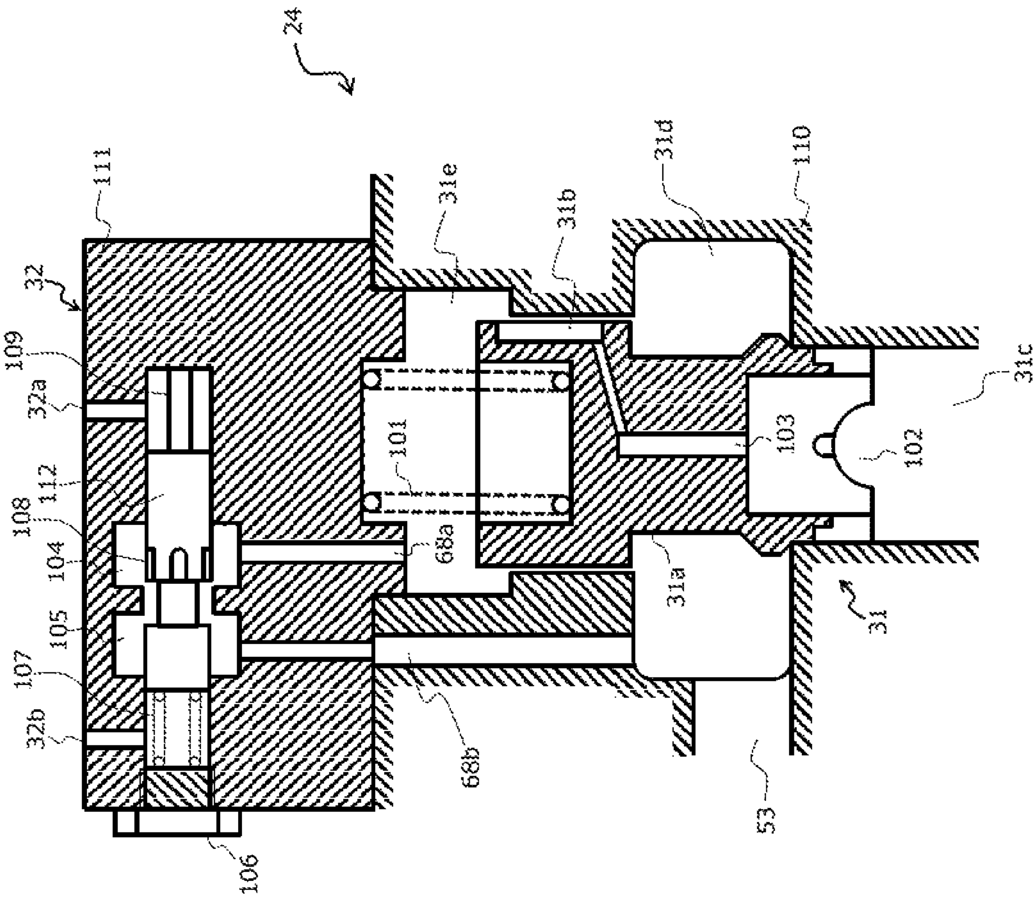
FIG. 5 is a sectional view of an auxiliary flow rate controller in the first embodiment of the present invention.

FIG. 5 is a sectional view of the auxiliary flow rate controller 24 in the first embodiment. Incidentally, the other auxiliary flow rate controllers each have a configuration similar to this as well.

The valve body 31*a* of the seat type main valve 31 is slidably installed in a housing 110. The first pressure chamber 31*c* located on an upstream side of the valve body 31*a* and the second pressure chamber 31*d* located on a downstream side thereof communicate with each other via an auxiliary variable restrictor formed between the housing 110 and the valve body 31*a*. The opening characteristic of this auxiliary variable restrictor is determined by the shape of a notch 102 formed in the valve body 31*a*. The valve body 31*a* is seated in the housing 110 by a spring 101 installed in the third pressure chamber 31*e*. The first pressure chamber 31*c* and the third pressure chamber 31*e* communicate with each other via a hydraulic fluid line 103 formed within the valve body 31*a*. The control variable restrictor 31*b* is formed between an exit on the third pressure chamber 31*e* side of the hydraulic fluid line 103 and a housing 111.

The pilot variable restrictor 32 is attached in such a manner as to face an end portion of the housing 110 in which the valve body 31*a* is installed. The pilot variable restrictor 32 includes the housing 111, the pilot spool 112, a spring 107, and a plug 106. The spring 107 that presses the pilot spool 112 is installed on one end portion side of the pilot spool 112. Another end portion of the pilot spool 112 is provided with a rod 109 that maintains the position of the pilot spool 112 by being in contact with the housing 111.

An oil chamber 104 and an oil chamber 105 are formed between the pilot spool 112 and the housing 111. The oil chamber 104 and the oil chamber 105 communicate with each other by a restrictor formed between the pilot spool 112 and the housing 111. The oil chamber 104 and the third pressure chamber 31*e* communicate with each other via the hydraulic fluid line 68*a*. The oil chamber 105 and the second pressure chamber 31*d* communicate with each other via the hydraulic fluid line 68*b*. The opening characteristic of this restrictor portion is determined by the shape of notches 108 formed in the pilot spool 112.

Incidentally, various shapes and combinations thereof other than the illustrated shapes are also used for the notch 102, the control variable restrictor 31*b*, and the notch 108 in order to obtain opening characteristics desired by a designer.

Figure 6:
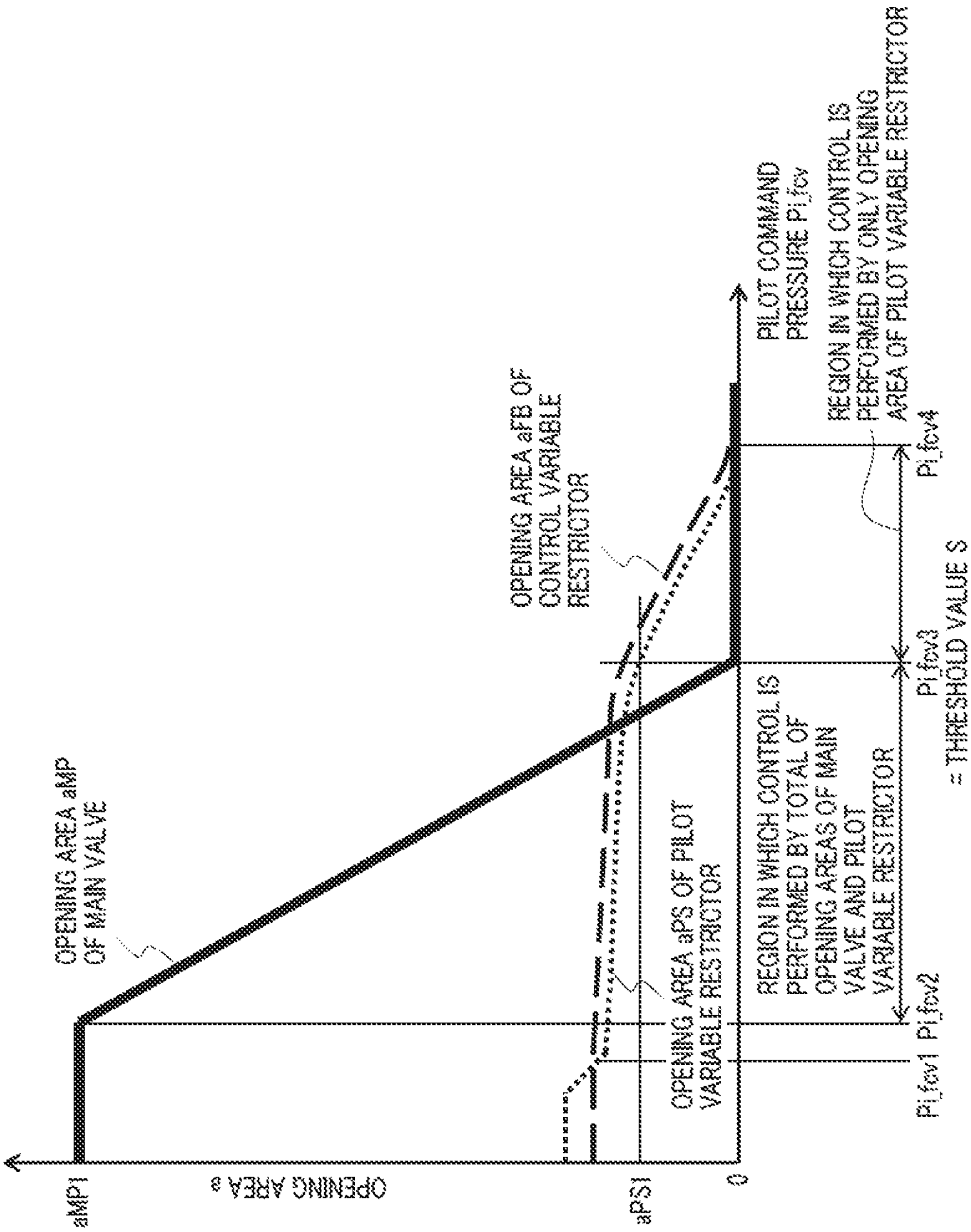
FIG. 6 is a diagram of opening areas of the auxiliary flow rate controller in the first embodiment of the present invention.

FIG. 6 is a diagram of opening areas of the auxiliary flow rate controller 24 in the first embodiment. FIG. 6 depicts changes in the respective opening areas of the pilot variable restrictor 32, the control variable restrictor 31*b*, and the main valve 31 with respect to the pilot command pressure Pi_fcv. Incidentally, the other auxiliary flow rate controllers each have a configuration similar to this as well.

The opening area aPS of the pilot variable restrictor 32 and the opening area aFB of the control variable restrictor 31*b* have an opening control region in which the pilot command pressure Pi_fcv is from Pi_fcv1 to Pi_fcv4. On the other hand, the opening area aMP of the main valve 31 has an opening control region in which the pilot command pressure Pi_fcv is from Pi_fcv2 (>Pi_fcv1) to Pi_fcv3 (<Pi_fcv4). A maximum opening area aMP1 of the main valve 31 is set sufficiently large with respect to the opening area aPS of the pilot variable restrictor 32 and the opening area aFB of the control variable restrictor 31*b*.

When the pilot command pressure Pi_fcv is in a range from Pi_fcv2 to Pi_fcv3, the opening amount of the auxiliary flow rate controller 24 is equal to a sum of the opening area aMP of the main valve 31 and the opening area aFB of the pilot variable restrictor 32. On the other hand, when the pilot command pressure Pi_fcv is in a range from Pi_fcv3 to Pi_fcv4, the opening area aMP of the main valve 31 is zero, and therefore the opening amount of the auxiliary flow rate controller 24 is equal to the opening area aFB of the pilot variable restrictor 32. Thus, with respect to the pilot command pressure Pi_fcv, the auxiliary flow rate controller 24 has a region in which the opening amount is controlled by a sum of the opening area aMP of the main valve 31 and the opening area aPS of the pilot variable restrictor 32 and a region in which the opening amount is controlled by only the opening area aPS of the pilot variable restrictor 32. Switching between these regions is performed with the predetermined pilot command pressure Pi_fcv3 (threshold value S) as a boundary.

(2) Operation

In the hydraulic drive system 400 in the first embodiment thus configured, operation and control as described in the following can be performed. Incidentally, in order to simplify the following description, the description will be made of operation performed in a state in which the region limiting control of the hydraulic excavator 300 is enabled by inputting a signal to enable the region limiting control of the hydraulic excavator 300 from the control enabling switch 84 to the controller 82 and in a case where the second boom directional control valve 10 and the first arm directional control valve 11 arranged in parallel with respect to the second hydraulic pump 2 need flow division.

The controller 82 makes, when a signal to enable the region limiting control of the hydraulic excavator 300 is sent from the control enabling switch 84 to the controller 82, the solenoid proportional pressure reducing valves 83*b* to 83*e* of the solenoid valve unit 83 generate the pilot command pressures Pi_ms of the directional control valves 10 and 11 according to lever operation amounts input from the control levers 81*a* and 81*b*, and makes the pilot command pressures Pi_ms act on the pilot ports of the directional control valves 10 and 11.

Consequently, the actuators 204*a* and 205*a* can be driven under control of the controller 82, and the region limiting control of the hydraulic excavator 300 is performed.

The controller 82 computes the target flow rates of the actuators on the basis of operation amounts of the respective actuators and the operation state of the hydraulic excavator 300, the operation state being obtained from each stroke sensor, and outputs command electric signals generated on the basis of the target flow rates and the pressures obtained from the pressure sensors to the solenoid proportional pressure reducing valves 35 and 36. The solenoid proportional pressure reducing valves 35 and 36 generate pilot command pressures Pi_fcv according to the command electric signals from the controller 82, and make the pilot command pressures Pi_fcv act on the pilot ports 32*a* and 34*a* of the pilot variable restrictors 32 and 34 of the auxiliary flow rate controllers 24 and 25.

The pilot variable restrictors 32 and 34 change the opening area aPS by shifting the pilot spool 112 according to the pilot command pressure Pi_fcv. Here, when the pilot command pressure Pi_fcv≥Pi_fcv1, the opening area aFB of the control variable restrictor 31*b* or 33*b* also changes according to the change in the opening area aPS of the pilot variable restrictor 32 or 34. At this time, relation between the opening area aFB of the control variable restrictor 31*b* or 33*b* and the opening area aPS of the pilot variable restrictor 32 or 34 is as follows.

[Math. 1]

$$aFB=K\times aPS \quad (1)$$

K is a coefficient determined by the shape of the main valve.

The opening area aFB of the control variable restrictor 31*b* or 33*b* changes according to a shift of the valve body 31*a* or 33*a*. Thus, when the opening area aPS of the pilot variable restrictor 32 or 34 changes, the valve body 31*a* or 33*a* is shifted, and a ratio between the opening area aFB of the control variable restrictor 31*b* or 33*b* and the opening area aPS of the pilot variable restrictor 32 or 34 is held constant. At this time, the opening area aMP of the main valve 31 or 33 also changes according to the shift of the valve body 31*a* or 33*a*. Thus, the opening area aMP of the main valve 31 or 33 changes according to the pilot command pressure Pi_fcv when the pilot command pressure Pi_fcv≥Pi_fcv2.

Here, when the pilot command pressure Pi_fcv is Pi_fcv2 Pi_fcv<Pi_fcv3, the opening amount of the auxiliary flow rate controller 24 or 25 coincides with a sum of the opening area aMP of the main valve 31 or 33 and the opening area aPS of the pilot variable restrictor 32 or 34. That is, the opening amount of the auxiliary flow rate controller 24 or 25 is controlled by a total opening area of the pilot variable restrictor 32 or 34 and the main valve 31 or 33.

When the pilot command pressure Pi_fcv is Pi_fcv3 Pi_fcv<Pi_fcv4, the opening area aMP of the main valve 31 or 33 is zero. Thus, the opening amount of the auxiliary flow rate controller 24 or 25 coincides with the opening area aPS of the pilot variable restrictor 32 or 34. That is, the opening amount of the auxiliary flow rate controller 24 or 25 is controlled by only the opening area aPS of the pilot variable restrictor 32 or 34.

While the operation of the auxiliary flow rate controllers 24 and 25 has been described above, the operation of the other auxiliary flow rate controllers is also similar.

(3) Effects

In the first embodiment, the work machine 300 includes the machine body 202; the work device 203 attached to the machine body 202; the plurality of actuators 204*a*, 205*a*, 206*a*, and 211 that drive the machine body 202 or the work device 203; the hydraulic pumps 1 to 3; the plurality of directional control valves 6 to 16 that are connected in parallel to the delivery lines 40, 50, and 60 of the hydraulic pumps 1 to 3, and adjust flows of hydraulic fluid supplied from the hydraulic pumps 1 to 3 to the plurality of actuators 204*a*, 205*a*, 206*a*, and 211; the control levers 81*a* and 81*b* for giving an instruction for operation of the plurality of actuators 204*a*, 205*a*, 206*a*, and 211; the pilot pump 4; the solenoid valve unit 83 that reduces a pressure of hydraulic fluid supplied from the pilot pump 4, and outputs the reduced pressure as operation pressures of the plurality of directional control valves 6 to 16; the controller 82 that outputs a command to the solenoid valve unit 83 according to operation instruction amounts from the control levers 81*a* and 81*b*; and the auxiliary flow rate controllers 21 to 29 that are respectively arranged upstream of the plurality of directional control valves 6 to 16, and limit flow rates of hydraulic fluid supplied from the hydraulic pumps 1 to 3 to the plurality of directional control valves 6 to 16. The auxiliary flow rate controllers 21 to 29 each include the seat type main valve 31 or 33, the control variable restrictor 31*b* or 33*b* that changes an opening area according to an amount of movement of the valve body 31*a* or 33*a* of the main valve 31 or 33, the pilot line 68 or 69 that connects a downstream side of the main valve 31 or 33 and a downstream side of the control variable restrictor 31*b* or 33*b* to each other and that decides the amount of movement of the valve body 31*a* or 33*a* according to a passing flow rate, and the spool type pilot variable restrictor 32 or 34 that is disposed on the pilot line 68 or 69 and that changes an opening area according to a command from the controller 82. The auxiliary flow rate controllers 21 to 29 are each configured such that the opening area aMP of the main valve 31 or 33 changes between the maximum opening area aMP1 and zero according to the opening area aPS of the pilot variable restrictor 32 or 34 when the opening area aPS of the pilot variable restrictor 32 or 34 is equal to or more than a predetermined opening area aPS1 and that the opening area aMP of the main valve 31 or 33 is zero irrespective of the opening area aPS of the pilot variable restrictor 32 or 34 when the opening area aPS of the pilot variable restrictor 32 or 34 is less than the predetermined opening area aPS1.

According to the first embodiment configured as described above, when a region limiting control function is enabled, the auxiliary flow rate controllers 21 to 29 can supply target flow rates commanded by the controller 82 to the actuators without depending on load variations of the actuators.

In addition, in an operation performed when the demanded flow rate of an actuator is large or when a pressure difference between the hydraulic pump and the actuator is small, that is, in an operation in which the opening amount of the auxiliary flow rate controller 21 to 29 needs to be increased, the opening amount of the auxiliary flow rate controller 21 to 29 can be adjusted by the total opening area of the pilot variable restrictor 32 or 34 and the main valve 31 or 33 by opening the main valve 31 or 33 together with the pilot variable restrictor 32 or 34.

On the other hand, in an operation performed when the pressure difference between the hydraulic pump and the actuator is large and the demanded flow rate of the actuator is small, that is, in an operation in which the opening amount of the auxiliary flow rate controller 21 to 29 needs to be decreased, the opening amount of the auxiliary flow rate controller 21 to 29 can be adjusted by only the opening area aPS of the pilot variable restrictor 32 or 34 by closing the seat type main valve 31 or 33 and opening only the spool type pilot variable restrictor 32 or 34. It is thereby possible to adjust with high accuracy the flow rate supplied to the actuator, and therefore improve accuracy of control of the actuator.

Second Embodiment

Figure 7:
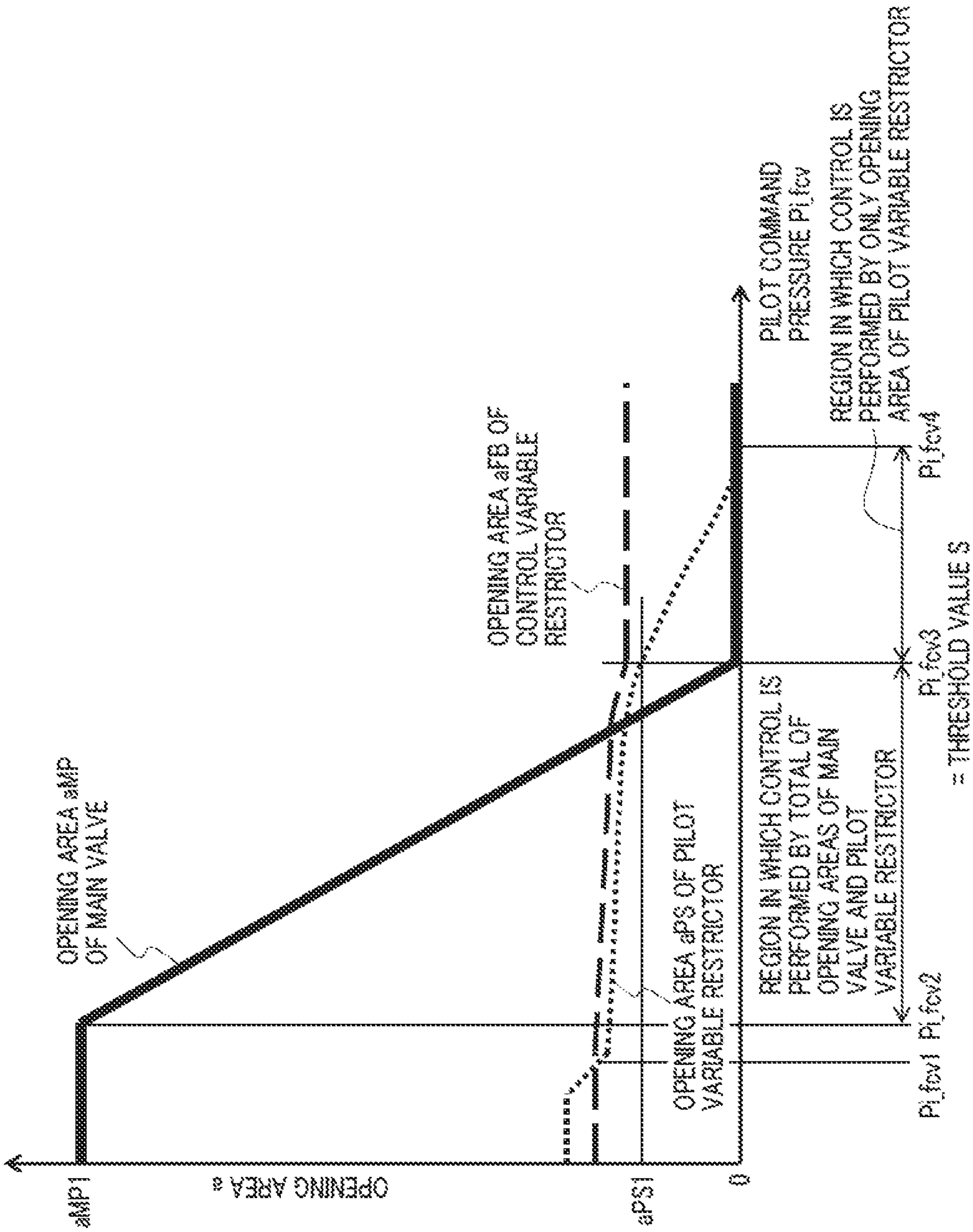
FIG. 7 is a diagram of opening areas of an auxiliary flow rate controller in a second embodiment of the present invention.

FIG. 7 is a diagram of opening areas of auxiliary flow rate controllers 21 to 29 in a second embodiment of the present invention.

(1) Configuration

A configuration of a hydraulic drive system in the second embodiment is substantially similar to that of the hydraulic drive system 400 in the first embodiment (depicted in FIG. 2A and FIG. 2B), but is different from that of the hydraulic drive system 400 in the first embodiment in the following respects.

In a region from the pilot command pressure Pi_fcv3 to Pi_fcv4, in which the opening amount is controlled by only the opening area aPS of the pilot variable restrictor 32 or 34, the opening area aFB of the control variable restrictor 31*b* is constant. At this time, relation between the opening area aFB of the control variable restrictor 31*b* or 33*b* and the opening area aPS of the pilot variable restrictor 32 or 34 is as follows.

[Math. 2]

$$aFB=K\times aPS \quad (2)$$

K is a coefficient determined by the shape of the main valve

Pi_fcv2≤Pi_fcv<Pi_fcv3

[Math. 3]

$$aFB>K\times aPS \quad (3)$$

Pi_fcv3≤Pi_fcv<Pi_fcv4

(2) Operation

Operation of the hydraulic drive system in the second embodiment is substantially similar to the operation of the hydraulic drive system 400 in the first embodiment, but is different from the operation of the hydraulic drive system 400 in the first embodiment in the following respects.

When the pilot command pressure Pi_fcv is Pi_fcv3 Pi_fcv<Pi_fcv4, the opening amount of the auxiliary flow rate controller 24 or 25 is controlled by only the opening area aPS of the pilot variable restrictor 32 or 34. At this time, the opening area aFB of the control variable restrictor 31*b* or 33*b* assumes a constant value with respect to the pilot command pressure Pi_fcv, and is larger than K times the opening area aPS of the pilot variable restrictor 32 or 34.

(3) Effects

The auxiliary flow rate controllers 24 and 25 in the second embodiment are each configured such that the opening area aFB of the control variable restrictor 31*b* or 33*b* is a predetermined coefficient (K) times the opening area aPS of the pilot variable restrictor 32 or 34 when the opening area aPS of the pilot variable restrictor 32 or 34 is equal to or more than the predetermined opening area aPS1 (when the pilot command pressure Pi_fcv is equal to or lower than the threshold value S) and that the opening area aFB of the control variable restrictor 31*b* or 33*b* is larger than the predetermined coefficient (K) times the opening area aPS of the pilot variable restrictor 32 or 34 when the opening area aPS of the pilot variable restrictor 32 or 34 is less than the predetermined opening area aPS1.

The second embodiment configured as described above provides the following effects in addition to effects similar to those of the first embodiment.

When the opening amount of the auxiliary flow rate controller 24 or 25 is controlled by only the pilot variable restrictor 32 or 34, the opening area aFB of the control variable restrictor 31*b* or 33*b* located upstream of the pilot variable restrictor 32 or 34 is larger than K times the opening area aPS of the pilot variable restrictor 32 or 34. It is therefore possible to reduce an undesired pressure loss and improve pressure responsiveness on the upstream side of the pilot variable restrictor 32 or 34 (third pressure chamber 31*e* or 33*e*). Thus, flow rate control can be performed with high responsiveness to pressure variations in actuator load pressure, pump pressure, or the like.

Third Embodiment

Figure 8A:
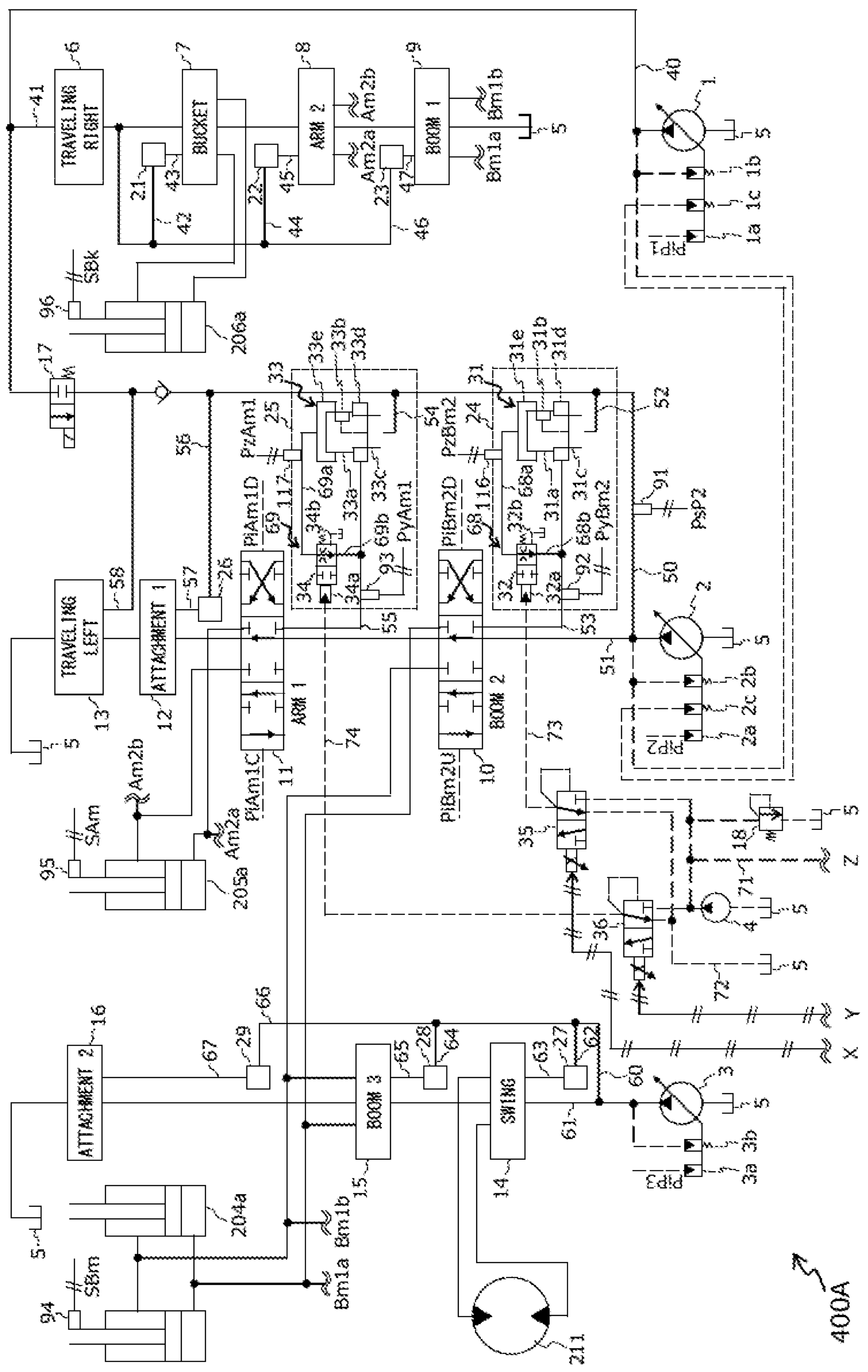
FIG. 8A is a circuit diagram (1/2) of a hydraulic drive system in the second embodiment of the present invention.
Figure 8B:
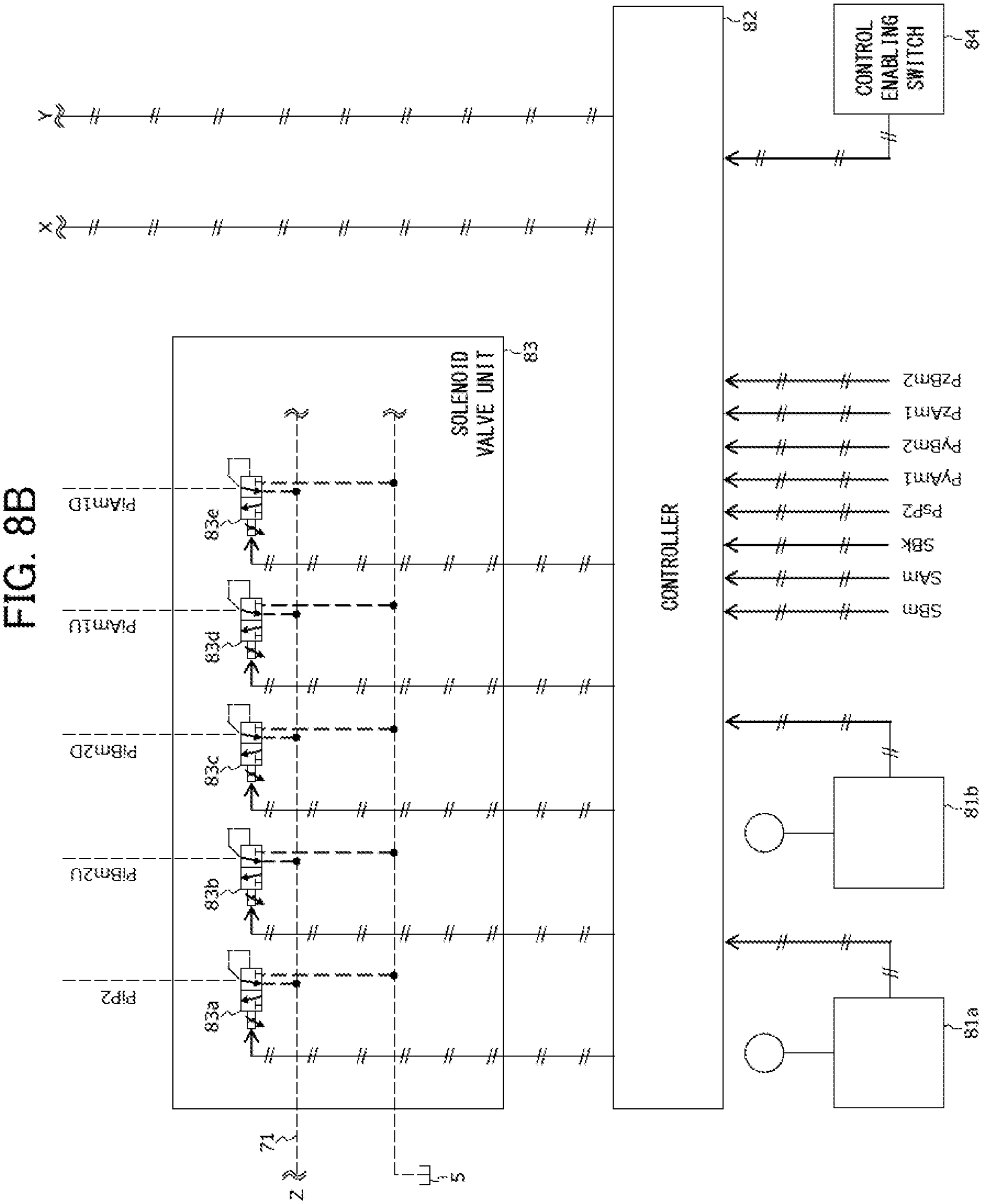
FIG. 8B is a circuit diagram (2/2) of the hydraulic drive system in the second embodiment of the present invention.

FIG. 8A and FIG. 8B are circuit diagrams of a hydraulic drive system in a third embodiment of the present invention.

(1) Configuration

As depicted in FIG. 8A and FIG. 8B, a configuration of a hydraulic drive system 400A in the third embodiment is substantially similar to that of the hydraulic drive system 400 in the first embodiment (depicted in FIG. 2A and FIG. 2B), but is different from that of the hydraulic drive system 400 in the first embodiment in the following respects.

A pressure sensor 116 is provided to the hydraulic fluid line 68*a* that makes the third pressure chamber 31*e* and the pilot variable restrictor 32 of the auxiliary flow rate controller 24 communicate with each other. A pressure sensor 117 is provided to the hydraulic fluid line 69*a* that makes the third pressure chamber 33*e* and the pilot variable restrictor 34 of the auxiliary flow rate controller 25 communicate with each other. Output signals of the pressure sensors 116 and 117 are input to the controller 82. Incidentally, though partly not depicted for simplification of the description, the auxiliary flow rate controllers 21 to 29 and peripheral apparatuses, piping, and wiring all have same configurations.

Figure 9:
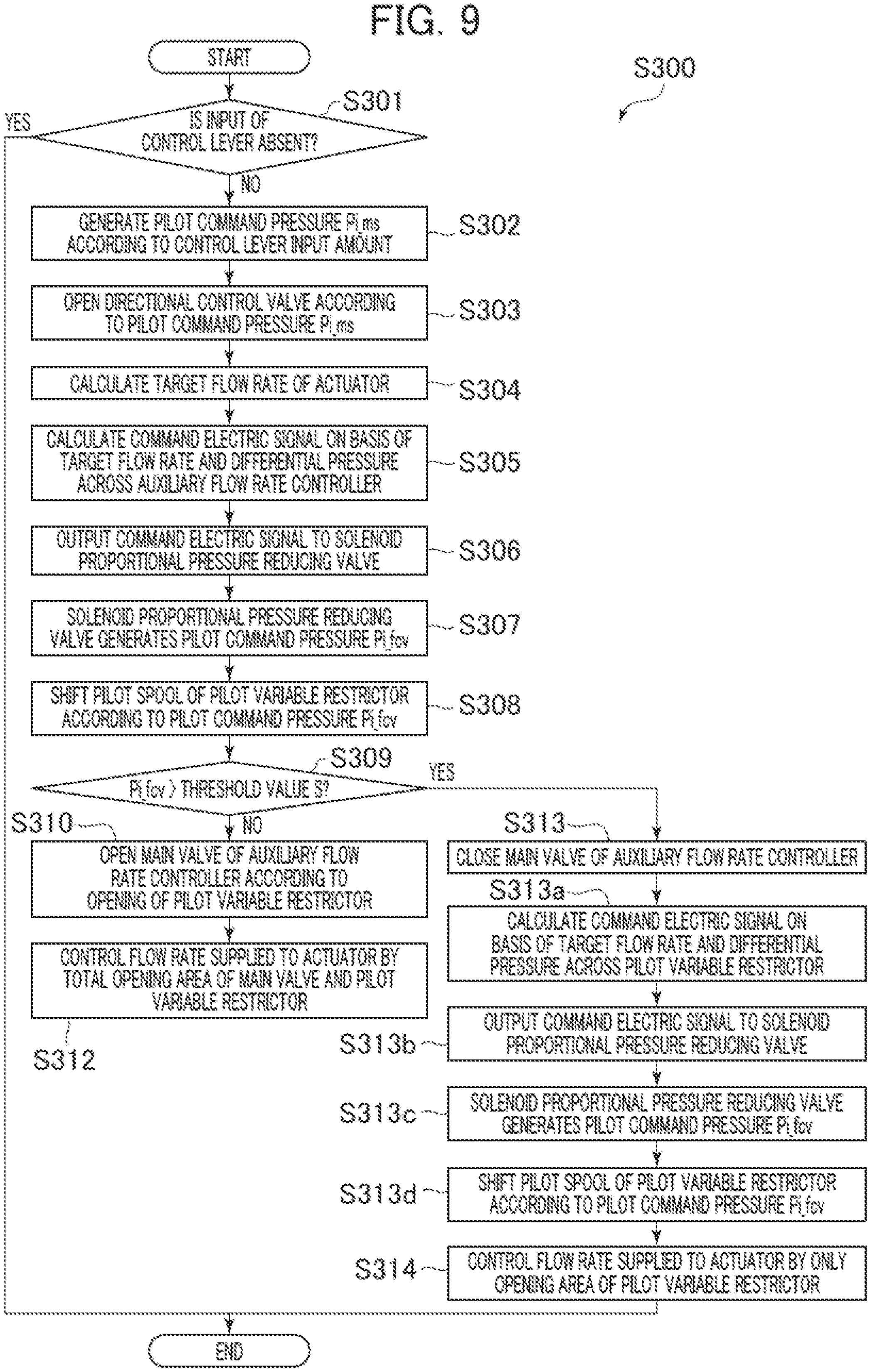
FIG. 9 is a flowchart depicting details of control enabling processing in computation processing of a controller in a third embodiment of the present invention.

FIG. 9 is a flowchart depicting details of step S300 (control enabling processing) in the computation processing of the controller 82 in the third embodiment. In FIG. 9, a difference from the first embodiment (depicted in FIG. 4C) is an addition of steps S313*a* to S313*d* between step S313 and step S314. In the following, steps S313*a* to S313*d* will be described.

Following step S313, the command electric signal computing section 82*f* of the controller 82 calculates a command electric signal on the basis of the target flow rate of the actuator 204*a* and a differential pressure across the pilot variable restrictor 32 or 34 (S313*a*), and the output section 82*g* of the controller 82 outputs the command electric signal to the solenoid proportional pressure reducing valve 35 or 36 (S313*b*).

Following step S313*b*, the solenoid proportional pressure reducing valve 35 or 36 generates a pilot command pressure Pi_fcv corresponding to the command electric signal (S315A), and shifts the pilot spool 112 of the pilot variable restrictor 32 or 34 according to the pilot command pressure Pi_fcv (S313*d*). The processing then proceeds to step S318.

Incidentally, while only processing with regard to the auxiliary flow rate controllers 24 and 25 has been described in the foregoing, similar processing is also performed with regard to the other auxiliary flow rate controllers.

(2) Operation

Operation of the hydraulic drive system 400A in the third embodiment is substantially similar to the operation of the hydraulic drive system 400 in the first embodiment, but is different from the operation of the hydraulic drive system 400 in the first embodiment in the following respects.

When the pilot command pressure Pi_fcv is Pi_fcv3≤Pi_fcv<Pi_fcv4, the opening amount of the auxiliary flow rate controller 24 or 25 is controlled by only the opening area aPS of the pilot variable restrictor 32 or 34. At this time, the controller 82 calculates the command electric signal on the basis of the target flow rate and output values from the pressure sensors 92 or 93 and 116 or 117, and outputs the command electric signal to the solenoid proportional pressure reducing valve 35 or 36.

(3) Effects

The work machine 300 in the third embodiment includes the pressure sensors 92, 93, 116, and 117 that detect differential pressures across the pilot variable restrictors 32 and 34. The controller 82, when the opening area aPS of the pilot variable restrictor 32 or 34 is less than the predetermined opening area aPS1 (when the pilot command pressure Pi_fcv exceeds the threshold value S), calculates a command (pilot command pressure Pi_fcv) for the pilot variable restrictor 32 or 34 on the basis of the across pressure detected by the pressure sensors 92 or 93 and 116 or 117 such that the passing flow rate of the pilot variable restrictor 32 or 34 coincides with the target flow rate of the auxiliary flow rate controller 24 or 25 (target flow rate of the actuator).

The third embodiment configured as described above provides the following effects in addition to effects similar to those of the first embodiment.

When the opening amount of the auxiliary flow rate controller 24 or 25 is controlled by only the pilot variable restrictor 32 or 34, the command electric signal is calculated and output on the basis of the differential pressure across the pilot variable restrictor 32 or 34. Thus, the passing flow rate of the auxiliary flow rate controller 24 or 25 can be controlled more accurately than when the differential pressure across the auxiliary flow rate controller 24 or 25 is used. It is thereby possible to further improve the accuracy of control of the actuators.

The embodiments of the present invention have been described above in detail. However, the present invention is not limited to the foregoing embodiments, but includes various modifications. For example, the foregoing embodiments have been described in detail in order to describe the present invention in an easily understandable manner, and are not necessarily limited to the embodiments including all of the described configurations. In addition, it is possible to add a part of a configuration of a certain embodiment to a configuration of another embodiment, and it is possible to omit a part of a configuration of a certain embodiment or replace a part of a configuration of a certain embodiment with a part of another embodiment.

DESCRIPTION OF REFERENCE CHARACTERS

1: First hydraulic pump
1*a*: Flow rate control command pressure port (regulator)
1*b*: First hydraulic pump self-pressure port (regulator)
1*c*: Second hydraulic pump self-pressure port (regulator)
2: Second hydraulic pump
2*a*: Flow rate control command pressure port (regulator)
2*b*: First hydraulic pump self-pressure port (regulator)
2*c*: Second hydraulic pump self-pressure port (regulator)
3: Third hydraulic pump
3*a*: Flow rate control command pressure port (regulator)
3*b*: Third hydraulic pump self-pressure port (regulator)
4: Pilot pump
5: Hydraulic operating fluid tank
6: Right travelling directional control valve
7: Bucket directional control valve
8: Second arm directional control valve
9: First boom directional control valve
10: Second boom directional control valve
11: First arm directional control valve
12: First attachment directional control valve
13: Left travelling directional control valve
14: Swing directional control valve
15: Third boom directional control valve
16: Second attachment directional control valve
17: Confluence valve
18: Pilot relief valve
21 to 29: Auxiliary flow rate controller
31: Main valve
31*a*: Valve body
31*b*: Control variable restrictor
31*c*: First pressure chamber
31*d*: Second pressure chamber
31*e*: Third pressure chamber
32: Pilot variable restrictor
32*a*: Pilot port
33: Main valve
33*a*: Valve body
33*b*: Control variable restrictor
33*c*: First pressure chamber
33*d*: Second pressure chamber
33*e*: Third pressure chamber
34: Pilot variable restrictor
34*a*: Pilot port
35, 36: Solenoid proportional pressure reducing valve
40: Delivery line
41: Center bypass line
42 to 47: Hydraulic fluid line
50: Delivery line
51: Center bypass line
52 to 58: Hydraulic fluid line
60: Delivery line
61: Center bypass line
62 to 67: Hydraulic fluid line
68: Pilot line
68*a*, 68*b*: Hydraulic fluid line
69: Pilot line
69*a*, 69*b*: Hydraulic fluid line
71: Hydraulic fluid line
81*a*, 81*b*: Control lever
82: Controller
82*a*: Input section
82*b*: Control enablement determining section
82*c*: Machine body posture computing section
82*d*: Demanded flow rate computing section
82*e*: Target flow rate computing section
82*f*: Command electric signal computing section
82*g*: Output section
83: Solenoid valve unit
83*a* to 83*e*: Solenoid proportional pressure reducing valve
84: Control enabling switch
91 to 93: Pressure sensor
94 to 96: Stroke sensor
101: Spring
102: Notch
103: Hydraulic fluid line
104: Oil chamber
105: Oil chamber
106: Plug
107: Spring
108: Notch
109: Rod
110: Housing
111: Housing
112: Pilot spool
116, 117: Pressure sensor
201: Track structure

202: Swing structure (machine body)
203: Work device
204: Boom
204*a*: Boom cylinder (actuator)
205: Arm
205*a*: Arm cylinder (actuator)
206: Bucket
206*a*: Bucket cylinder (actuator)
207: Cab
208: Machine room
209: Counterweight
210: Control valve
211: Swing motor (actuator)
300: Hydraulic excavator (work machine)
400, 400A: Hydraulic drive system

The invention claimed is:

1. A work machine comprising:
a machine body;
a work device including a boom attached to the machine body, an arm attached to a distal end of the boom, and a bucket attached to a distal end of the arm;
a plurality of actuators that drive the machine body or the work device;
a hydraulic pump;
a plurality of directional control valves that are connected in parallel to a delivery line of the hydraulic pump and adjust flows of hydraulic fluid supplied from the hydraulic pump to the plurality of actuators;
a control lever for giving an instruction for operation of the plurality of actuators;
a pilot pump;
a solenoid valve unit plurality of solenoid proportional pressure reducing valves that reduces reduce a pressure of hydraulic fluid supplied from the pilot pump, and outputs output the reduced pressure as operation pressures of the plurality of directional control valves;
a controller that outputs commands to the solenoid valve unit plurality of solenoid proportional pressure reducing valves according to an operation instruction amount from the control lever; and
auxiliary flow rate controllers that are respectively arranged upstream of the plurality of directional control valves and limit flow rates of hydraulic fluid supplied from the hydraulic pump to the plurality of directional control valves; wherein
the auxiliary flow rate controllers each include
a seat type main valve, the main valve being provided with a control variable restrictor that changes an opening area according to an amount of movement of a valve body of the main valve,
a control variable restrictor that changes an opening area according to an amount of movement of a valve body of the main valve,
a pilot line that connects a downstream side of the main valve and a downstream side of the control variable restrictor to each other and decides the amount of movement of the valve body according to a passing flow rate, and
a spool type pilot variable restrictor that is disposed on the pilot line and changes an opening area according to a command from the controller;
the auxiliary flow rate controllers each being configured such that
an opening amount of the auxiliary flow rate controller is controlled by changing an opening area of the main valve changes between a maximum opening amount and zero according to the opening area of the pilot variable restrictor in a case where the opening area of the pilot variable restrictor is equal to or more than a predetermined opening area due to a large demanded flow rate of the actuator and
the opening amount of the auxiliary flow rate controller is controlled by making the opening area of the main valve is zero irrespective of and controlling only the opening area of the pilot variable restrictor in a case where the opening area of the pilot variable restrictor is less than the predetermined opening area due to a small demanded flow rate of the actuator.

2. The work machine according to claim 1, wherein
the auxiliary flow rate controllers are each configured such that
the opening area of the control variable restrictor is a predetermined coefficient times the opening area of the pilot variable restrictor in a case where the opening area of the pilot variable restrictor is equal to or more than the predetermined opening area and
the opening area of the control variable restrictor is larger than the predetermined coefficient times the opening area of the pilot variable restrictor in a case where the opening area of the pilot variable restrictor is less than the predetermined opening area.

3. The work machine according to claim 1, wherein
the work machine includes a pressure sensor that detects a differential pressure across the pilot variable restrictor, and
the controller is configured to, in a case where the opening area of the pilot variable restrictor is less than the predetermined opening area, calculate the command for the pilot variable restrictor on a basis of the across differential pressure detected by the pressure sensor such that a passing flow rate of the pilot variable restrictor coincides with a target passing flow rate of the auxiliary flow rate controller.

* * * * *